United States Patent [19]

Cox et al.

[11] 4,433,701

[45] Feb. 28, 1984

[54] POLYMER FLOOD MIXING APPARATUS AND METHOD

[75] Inventors: Bruce M. Cox; Stanley V. Stephenson, both of Duncan, Okla.

[73] Assignee: Halliburton Company, Duncan, Okla.

[21] Appl. No.: 284,658

[22] Filed: Jul. 20, 1981

[51] Int. Cl.³ ............................................. G05D 11/13
[52] U.S. Cl. .................................. 137/101.19; 222/57; 366/152
[58] Field of Search ................. 137/3, 101.19; 222/57; 366/152; 417/3

[56] References Cited

U.S. PATENT DOCUMENTS

| | | | |
|---|---|---|---|
| 2,024,480 | 12/1935 | Short | 137/101.19 |
| 2,658,644 | 11/1953 | Lowe . | |
| 3,038,486 | 6/1962 | Thurman . | |
| 3,219,046 | 11/1965 | Waugh | 137/101.19 X |
| 3,229,077 | 1/1966 | Gross | 137/101.19 X |
| 3,410,293 | 11/1968 | Ernyei . | |
| 3,438,385 | 4/1969 | Nogami | 137/101.19 |
| 3,452,774 | 7/1969 | Stanton . | |
| 3,474,815 | 10/1969 | Beahm | 137/101.19 |
| 3,475,392 | 10/1969 | McCoy et al. . | |
| 3,605,775 | 9/1971 | Zaander et al. | 137/3 |
| 3,606,903 | 9/1971 | Porter et al. . | |
| 3,609,316 | 9/1971 | Brosset et al. . | |
| 3,705,597 | 12/1972 | Kramer et al. . | |
| 3,721,253 | 3/1973 | Remke . | |
| 3,843,099 | 10/1974 | Duncan . | |
| 4,006,752 | 2/1977 | DeVale . | |
| 4,007,755 | 2/1977 | Lerner et al. . | |
| 4,112,515 | 9/1978 | Sandow | 137/101.19 X |
| 4,209,258 | 6/1980 | Oakes | 366/152 X |
| 4,246,969 | 1/1981 | McLoughlin et al. . | |
| 4,265,266 | 5/1981 | Kierbow | 137/101.19 |

FOREIGN PATENT DOCUMENTS 637629  3/1962 Canada .
667957  6/1979 U.S.S.R. .

*Primary Examiner*—Robert G. Nilson
*Attorney, Agent, or Firm*—E. Harrison Gilbert, III; Joseph A. Walkowski; Thomas R. Weaver

[57] ABSTRACT

A method and an apparatus for controlling the viscosity of a mixture by controlling the volumetric flow of a fluid with respect to the volumetric flow of another fluid is disclosed. The apparatus includes volumetric flow detectors for detecting the flow of the two fluids. The apparatus also includes an electronic controller device which responds to electrical signals generated by the volumetric flow detectors in proportion to the respective detected volumetric flows. The output of the controller device operates a flow drive element, such as a pump, so that the volumetric flow of one of the fluids is controlled. The volumetric flow of the controlled fluid and the volumetric flow of the other fluid are mixed by a suitable mixer device to obtain the mixture having the desired viscosity.

7 Claims, 2 Drawing Figures

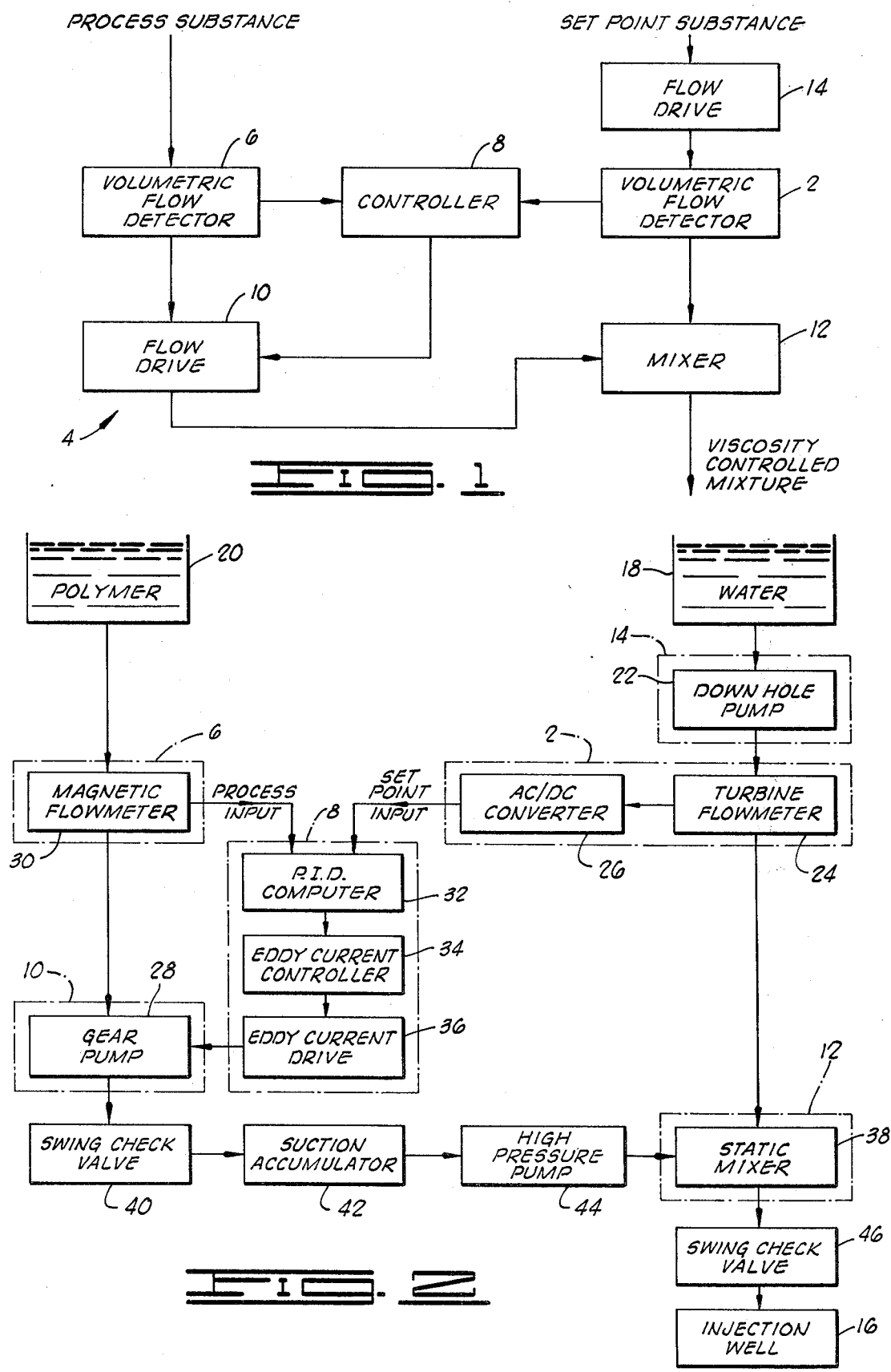

POLYMER FLOOD MIXING APPARATUS AND METHOD

This invention relates generally to a ratio controller and method for controlling the ratio of constituent streams of fluids flowing into a mixture so that the mixture has a desired viscosity. More particularly, but not by way of limitation, the present invention relates to an apparatus and method for controlling the volumetric flows of a polymer and of water which are to be combined in a mixture which is to have a selectable viscosity and which is to be pumped into an injection well for enhancing oil recovery.

In flood operations used to recover oil from a formation, salt water and other driving fluids having little viscosity have been used in attempts to drive the oil in the formation toward a production well. However, because the oil in the formation generally is more viscous than the salt water or other driving fluids, such a driving fluid often passes through the oil to the production well without carrying much oil with it. To enhance the oil recovery flood technique, it is desirable to use a more viscous driving fluid which has a viscosity of the order of the viscosity of the oil in the formation. Such viscous driving fluids include suitable polymeric mixtures.

Although a suitable polymeric solution can provide a better driving fluid to force the oil out of the formation and into the production well, such a viscous driving fluid can plug the injection well into which it is pumped if the viscosity of the driving fluid is not carefully controlled. To control the viscosity of the driving fluid, the polymeric solution can be mixed with salt water or other appropriate fluid having a relatively low viscosity. Because of the handling problems of transporting a suitable mixture to the injection well site, it is desirable that the mixture of the polymeric solution and the salt water or other fluid be made at the site of the injection well so that the resultant mixture can be pumped directly into the injection well.

When the mixing operation occurs at the injection well during the injection operation, it is difficult to adequately directly control the viscosity of the mixture because of the lack of suitable instruments which can directly determine viscosity during a continuous, real-time operation such as occurs when a polymeric solution and water are mixed and injected into an injection well. Such continuous, real-time control must be maintained because if the water flow into the mixture varies, the polymeric solution flow must also be varied to prevent a too viscous mixture from being pumped into the well and thereby plugging the injection well.

Therefore, there is the need for an apparatus and a method for providing a mixture of a first fluid, such as salt water, and a second fluid, such as a polymeric solution, which mixture has a selectable viscosity which can be maintained as the mixture is being used in a process, such as a well injection operation. Because of the difficulty in directly monitoring viscosity on continuous, real-time basis, it is desirable that this apparatus and this method control the viscosity of the resultant mixture by monitoring the volumetric flow of the constituent fluids and by controlling the volumetric flow of one of the fluids based on the volumetric flow of the other and on the desired viscosity of the resultant mixture.

The present invention meets these needs by providing a novel and improved apparatus and method for providing a mixture of a first fluid and a second fluid so that the mixture has a selectable viscosity. The apparatus broadly comprises a first flow detector means for detecting the volumetric flow of the first fluid and also comprises a second flow detector means for detecting the volumetric flow of the second fluid. The apparatus also includes a flow adjustment means which is responsive to the volumetric flows detected by the first flow detector means and the second flow detector means so that the volumetric flow of the second fluid is controlled with respect to the detected volumetric flow of the first fluid. The apparatus also includes a mixer means for mixing the flow of the first fluid with the controlled flow of the second fluid so that the mixture having the selectable viscosity is provided.

The first flow detector means generates a first electrical signal proportional to the volumetric flow of the first fluid, and the second flow detector means generates a second electrical signal proportional to the volumetric flow of the second fluid.

The flow adjustment means includes a microcomputer means which is responsive to the first electrical signal and to the second electrical signal for computing a desired volumetric flow of the second fluid to achieve a selectable viscosity when the desired volumetric flow of the second fluid is mixed with the volumetric flow of the first fluid. The microcomputer means also generates a control signal corresponding to the computed desired volumetric flow of the second fluid. The flow adjustment means also includes flow drive means which causes the second fluid to flow at the desired volumetric flow in response to the control signal generated by the microcomputer means.

Therefore, from the foregoing, it is a general object of the present invention to provide a novel and improved apparatus and method for providing a mixture of a first fluid and a second fluid so that the mixture has a selectable viscosity. Other and further objects, features and advantages of the present invention will be readily apparent to those skilled in the art when the following description of the preferred embodiments is read in conjunction with the accompanying drawings.

FIG. 1 is a functional block diagram of the preferred embodiment of the present invention.

FIG. 2 is a block diagram showing elements implementing a specific embodiment of the preferred embodiment shown in FIG. 1.

With reference to FIG. 1 the preferred embodiment of the present invention will be described. The present invention depicted in FIG. 1 includes an apparatus for providing a mixture of a first fluid, identified in FIG. 1 as a set point substance, and a second fluid, identified in FIG. 1 as a process substance, so that the mixture has a selectable viscosity. The set point substance is so named because the volumetric flow of this substance is used to control the volumetric flow of the process substance which is so named because it is the substance which is processed or controlled by the present invention.

The apparatus shown in FIG. 1 includes a first flow detector means 2 for detecting the volumetric flow of the set point substance. The first flow detector means 2 responds to the flow of the set point substance therethrough by providing a first electrical signal which is proportional to the volumetric flow of the set point substance. The first electrical signal is provided to a flow adjustment means 4.

The preferred embodiment of the apparatus shown in FIG. 1 also includes a second flow detector means 6 for detecting the volumetric flow of the second fluid or process substance. The second flow detector means 6 provides a second electrical signal which is proportional to the volumetric flow of the process substance. This second electrical signal is also provided to the flow adjustment means 4.

The flow adjustment means 4 is responsive to the volumetric flows detected by the first flow detector means 2 and the second flow detector means 6 as represented by the first electrical signal and the second electrical signal, respectively. In response to these two inputs the flow adjustment means 4 controls the volumetric flow of the second fluid with respect to the detected volumetric flow of the first fluid.

The flow adjustment means 4 includes a controller means 8 and a flow drive means 10. The controller means 8 generates a control signal which controls the flow drive means 10 so that the volumetric flow of the process substance is controlled in accordance with the present invention.

The apparatus shown in FIG. 1 also includes a mixer means 12 for mixing the flow of the first fluid with the controlled flow of the second fluid so that the mixture having the selectable viscosity is provided at the output of the mixer means 12.

To cause the set point substance, or first fluid, to flow, the apparatus shown in FIG. 1 also includes a flow drive means 14.

With reference to FIG. 2 a specific embodiment of the preferred embodiment shown in FIG. 1 will be described. The embodiment shown in FIG. 2 is adapted for use in mixing a polymer with water to provide a mixture having a selectable viscosity and for use in injecting the mixture into an injection well 16. The water is schematically illustrated in FIG. 2 as coming from a water source 18 and the polymer is schematically illustrated in FIG. 2 as coming from a polymer source 20.

In the FIG. 2 embodiment the water source 18 can be any suitable source of water found at the site of the injection well 16. For example, the water can include salt water or other type of water which is used in an oil recovery flood operation. Other suitable fluids can also be used.

The water from the source 18 is pumped or flowed from the source 18 by means of the flow drive means 14 specifically shown in FIG. 2 to include a downhole pump 22 of a suitable type known in the art. The downhole pump 22 includes an inlet connected to the source 18 and also includes an outlet connected to an inlet of the first flow detector means 2.

The inlet of the flow detector means 2 to which the outlet of the downhole pump 22 is connected is shown in the FIG. 2 embodiment to be an inlet of a turbine flowmeter 24 which has an outlet connected to the mixer means 12. The turbine flowmeter 24 is any suitable type, such as a turbine flowmeter manufactured by Halliburton Services Company. In the preferred embodiment the turbine flowmeter 24 is placed upstream of the injection point into the injection well 16 because the accuracy of a turbine flowmeter is affected by a polymeric fluid. The turbine flowmeter 24 receives the water flowing from the downhole pump 22 to the mixer means 12 and generates an alternating current signal which is proportional to the volumetric flow of the water. The alternating current signal is provided to an alternating current-to-direct current converter means 26 which forms a part of the flow detector means 2 and is of a type known in the art. The alternating current-to-direct current converter means 26 responds to the alternating current signal from the turbine flowmeter 24 by providing a direct current signal to the controller means 8. In the preferred embodiment this direct current signal is the aforementioned first electrical signal provided to the control means.

In the embodiment shown in FIG. 2 the polymer contained in the source 20 is any suitable polymer which can be mixed with the fluid from the source 18 for flooding a formation through the injection well 16. For example, the polymer may include polymerizable organic monomers, such as acrylamide, acrylic acid, and mixtures of such compounds. In the preferred embodiment these monomers are mixed with other chemicals to provide a concentrated polymeric solution which is contained in the source 20. Because this concentrated polymeric solution has a relatively high viscosity which would plug the injection well 16 if pumped directly into the injection well 16, the polymeric solution must be mixed in controlled quantities with the fluid from the source 18 to achieve a selectable viscosity which is large enough to force the oil from the formation into which the injection well 16 is drilled, yet which is small enough to prevent the mixture from plugging the injection well 16.

In the preferred embodiment the polymeric solution and the polymer or polymers therein are sensitive to shearing forces. To prevent an appreciable shearing force from being applied to the concentrated polymeric solution, the preferred embodiment shown in FIG. 2 is constructed of elements which have neglible shear on the polymeric solution flowing from the source 20 to the injection well 16.

The concentrated polymeric solution is flowed from the source 20 by means of the flow drive means 10 which includes in the FIG. 2 embodiment a gear pump means 28. The gear pump means 28 is of a type which effects a flow of the polymeric solution so that neglible shear acts on the polymeric solution as it is caused to flow from an inlet to an outlet of the gear pump 28. For example, the gear pump 28 may be of the type manufactured by Webster or Moyno.

The inlet of the gear pump 28 is connected to an output of the flow detector means 6 which is shown in FIG. 2 to specifically include a magnetic flowmeter 30 disposed directly in the flow path of the second fluid from the source 20. The magnetic flowmeter 30 has an inlet which receives the polymeric solution from the source 20. In response to the polymeric solution flowing through the magnetic flowmeter 30, the magnetic flowmeter 30 provides an electrical signal which is proportional to the volumetric flow of the polymeric solution. The electrical signal provided by the magnetic flowmeter 30 is transmitted to the controller means 8.

The magnetic flowmeter 30 is of any suitable type, such as a magnetic flowmeter manufactured by Foxboro. The magnetic flowmeter 30 is preferably one which operates without applying an appreciable shearing force to the polymer or polymeric solution flowing therethrough.

The control means, or controller, 8 is a ratio controller means which is responsive to the turbine flowmeter 24 of the flow detector means 2 and to the magnetic flowmeter means 30 of the flow detector means 6. In response to the signals from these flow detector means, the ratio controller means provides a ratio control signal which controls the gear pump 28 to adjust the flow of the polymeric solution so that when the controlled flow polymeric solution is mixed with the flow of water from the source 18, a mixture having a selectable viscosity is obtained. More particularly, the control means 8 controls the pump means 28 so that a selectable ratio between the volumetric flow of the water and the volumetric flow of the polymeric solution is maintained. Once the desired ratio, or viscosity parameter, is set in the control means 8, no further adjustment need be made to the apparatus until a change of ratio, or viscosity parameter, is desired.

In FIG. 2 the control means 8 includes a proportional integral and derivative computer means for generating an output signal in response to the first electrical signal provided by the flow detector means 2 and the second electrical signal provided by the flow detector means 6. The proportional integral and derivative computer means 32 includes microcomputer means for computing a desired volumetric flow of the polymeric solution to achieve a mixture having a selectable viscosity when the desired volumetric flow of the polymeric solution is mixed with the volumetric flow of the water. The microcomputer means generates a control signal corresponding to the computed desired volumetric flow of the polymeric solution.

Also included within the control means 8 is a gear pump control means which is responsive to the ratio control signal from the computer means 32. The gear pump control means particularly includes in the FIG. 2 embodiment an eddy-current control means 34 and an eddy-current drive means 36. These elements are of types known in the art, such as those provided by Louis Allis. The elements 34 and 36 respond to the signal from the computer means 32 to control the operation of the gear pump 28. In particular, the eddy-current controller means 34 provides an eddy-current control signal to the eddy-current drive means 36 which in turn provides an eddy-current drive signal to the gear pump 28. The eddy-current controller means 34 and the eddy-current drive means 36 are used so that the speed of the gear pump 28 can be varied without using a DC motor. It is desirable not to use a DC motor because such a motor has the shortcoming of requiring relatively frequent replacements of its brushes.

The flow of the water from the pump means 22 and the turbine flowmeter 24 and the flow of the polymeric solution from the flowmeter 30 and the gear pump means 28 are provided to the mixer means 12 which is shown in FIG. 2 to include a static mixer means 38 of a type known in the art, such as a static mixer provided by Komax. The static mixer 38 has a first inlet associated with the outlet of the turbine flowmeter 24 of the first flow detector means 2. The static mixer 38 also has a second inlet associated with the outlet of the second pump means identified in FIG. 2 as the gear pump 28. The static mixer 38 also has an outlet from which the mixture of the water and the polymeric solution is injected into the injection well 16. The static mixer 38 requires no external power other than that provided by the constituent streams flowing into the inlets of the static mixer 38. The static mixer is preferably used because it gently mixes the shear sensitive polymeric solution from the source 20 with the water from the source 18 so that appreciable shearing forces are prevented from affecting the polymeric solution.

To prevent high pressures from bleeding back to the low pressure components described hereinabove, the present invention also includes check valve means 40 specifically shown as a swing check valve of a type known in the art. This valve is connected between the outlet of the gear pump 28 and an inlet of a suction accumulator 42 of a type known in the art. The suction accumulator 42 can include, for example, a standpipe having the inlet flow received at the upper end of the standpipe and having the outlet flow provided from the lower end of the standpipe.

The outlet of the suction accumulator means 42 is connected to a high pressure pump means 44 which is utilized if a high pressure is required to pump the mixture into the injection well 16. If such a high pressure is not needed, the suction accumulator means 42 and the high pressure pump means 44 need not be used. The suction accumulator means 42 and the high pressure pump means 44 also are not required even though a high pressure is needed if a high pressure pump is used as the flow drive means 10.

To prevent high pressures from the injection well 16 from bleeding back into the static mixer means 38, a swing check valve 46 is provided between the outlet of the static mixer 38 and the mouth of the injection well 16.

During the operation of the present invention the flow detector means 2 monitors the volumetric flow of the water from the source 18, and the flow detector means 6 detects the volumetric flow of the polymeric solution from the source 20. The detected volumetric flow of the polymeric solution is compared with the monitored volumetric flow of the water and is also compared with a preselected ratio or viscosity parameter which the resultant mixture is desired to have. Based on this comparison, which is achieved by the proportional integration and derivative computer means 32, the gear pump 28 is controlled to adjust the volumetric flow of the polymeric solution. The controlled flow from the gear pump 28 is provided to the static mixer 38 along with the flow from the downhole pump means 22 and the turbine flowmeter 24 so that the adjusted flow of the polymeric solution and the flow of the water are mixed.

In this manner, the present invention directly controls the volumetric ratio between the polymeric soltion and the water and directly controls the viscosity of the resultant mixture. In the preferred embodiment wherein a mixture for flooding a formation to recover oil is to be obtained, a desirable viscosity for the mixture, such as approximately four centipoise, can be obtained.

In addition to controlling the viscosity of the mixture which is pumped into the injection well 16, the present invention also tracks the water flow rate from the source 18 and prevents any of the polymeric solution from being pumped directly into the injection well 16 if the flow of the water from the source 18 ceases.

In addition to being adaptable for the specific operation disclosed with reference to FIG. 2, the present invention can be used as a general purpose ratio controller where precise control of the ratio of the constituent streams of a process is required.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for mixing a polymer with water to provide a mixture having a selectable viscosity and for injecting the mixture into a well, comprising:
   first pump means for flowing the water, said first pump means having an outlet from which the water flows;
   first flow detector means for generating a first electrical signal proportional to the volumetric flow of the water, said first flow detector means having an inlet connected to the outlet of the first pump means and also having an outlet;
   second pump means for flowing the polymer, said second pump means having an inlet for receiving the polymer and also having an outlet for discharging the polymer;
   second flow detector means for generating a second electrical signal proportional to the volumetric flow of the polymer, said second flow detector means having an outlet from which the polymer flows and to which the inlet of said second pump means is connected;
   control means, responsive to said first electrical signal and said second electrical signal, for controlling said second pump means so that a selectable ratio between the volumetric flow of the water and the volumetric flow of the polymer is maintained, said control means including:
      proportional integral and derivative computer means for generating an output signal in response to said first electrical signal and said second electrical signal;
      eddy current controller means, responsive to said output signal from said proportional integral and derivative computer means, for providing an eddy current control signal; and
      eddy current drive means, responsive to said eddy current control signal, for providing an eddy current drive signal;
   mixer means for mixing the flow of the water with the controlled flow of the polymer, said mixer means having a first inlet associated with the outlet of said first flow detector means and also having a second inlet associated with the outlet of said second pump means and further having an outlet from which the mixture is injected into the well; and
   said second pump means is responsive to said eddy current drive signal.

2. An apparatus for mixing a polymer with water to provide a mixture having a selectable viscosity and for injecting the mixture into a well, comprising:
   first pump means for flowing the water, said first pump means having an outlet from which the water flows;
   first flow detector means for generating a first electrical signal proportional to the volumetric flow of the water, said first flow detector means having an inlet connected to the outlet of the first pump means and also having an outlet;
   second pump means for flowing the polymer, said second pump means having an inlet for receiving the polymer and also having an outlet for discharging the polymer;
   second flow detector means for generating a second electrical signal proportional to the volumetric flow of the polymer, said second flow detector means having an outlet from which the polymer flows and to which the inlet of said second pump means is connected, said second flow detector means including a magnetic flowmeter;
   control means, responsive to said first electrical signal and said second electrical signal, for controlling said second pump means so that a selectable ratio between the volumetric flow of the water and the volumetric flow of the polymer is maintained, said control means including:
      proportional integral and derivative computer means for generating an output signal in response to said first electrical signal and said second electrical signal;
      eddy current controller means, responsive to said output signal from said proportional integral and derivative computer means, for providing an eddy current control signal; and
      eddy current drive means, responsive to said eddy current control signal, for providing an eddy current drive signal;
   mixer means for mixing the flow of the water with the controlled flow of the polymer, said mixer means having a first inlet associated with the outlet of said first flow detector means and also having a second inlet associated with the outlet of said second pump means and further having an outlet from which the mixture is injected into the well; and
   said second pump means includes gear pump means responsive to said eddy current drive signal.

3. An apparatus as defined in claim 2, wherein said mixer means includes a static mixer.

4. An apparatus as defined in claim 3, wherein said first flow detector means includes:
   turbine flowmeter means through which the water flow passes to the first inlet of said mixer means; and
   alternating current-to-direct current converter means, responsive to said turbine flowmeter means, for providing said first electrical signal to said control means.

5. An apparatus as defined in claim 4, further comprising:
   first check valve means positioned between the outlet of said second pump means and the second inlet of said mixer means; and
   second check valve means positioned between the outlet of said mixer means and the well.

6. An apparatus for mixing a polymer with water to provide a mixture having a selectable viscosity and for injecting the mixture into a well, comprising:
   first pump means for flowing the water, said first pump means having an outlet from which the water flows;
   first flow detector means for generating a first electrical signal proportional to the volumetric flow of the water, said first flow detector means having an inlet connected to the outlet of the first pump means and also having an outlet;
   second pump means for flowing the polymer, said second pump means having an inlet for receiving the polymer and also having an outlet for discharging the polymer;
   second flow detector means for generating a second electrical signal proportional to the volumetric flow of the polymer, said second flow detector means having an outlet from which the polymer flows and to which the inlet of said second pump means is connected;

control means, responsive to said first electrical signal and said second electrical signal, for controlling said second pump means so that a selectable ratio between the volumetric flow of the water and the volumetric flow of the polymer is maintained;

mixer means for mixing the flow of the water with the controlled flow of the polymer, said mixer means having a first inlet associated with the outlet of said first flow detector means and also having a second inlet associated with the outlet of said second pump means and further having an outlet from which the mixture is injected into the well;

suction accumulator means having an inlet connected to the outlet of said second pump means and also having an outlet; and third pump means having an inlet connected to the outlet of said suction accumulator means and also having an outlet connected to the second inlet of said mixer means.

7. An apparatus for mixing a shear-sensitive polymer with water to achieve a mixture having a selectable viscosity, comprising:

first flow detector means for detecting the volumetric flow of the water;

second flow detector means for detecting the volumetric flow of the polymer without applying appreciable shear to the polymer flow;

proportional integral and derivative computer means for generating an output signal in response to said first flow detector means and said second flow detector means;

eddy current controller means, responsive to said output signal, for providing an eddy current control signal;

eddy current drive means, responsive to said eddy current control signal, for providing an eddy current drive signal;

flow drive means, responsive to said eddy current drive signal, for causing the polymer to flow with negligible shear acting on the polymer; and mixer means for mixing the controlled flow of the polymer with the flow of the water to obtain the mixture having the selectable viscosity.

* * * * *